(12) United States Patent
Jiang et al.

(10) Patent No.: US 9,699,140 B1
(45) Date of Patent: Jul. 4, 2017

(54) SYSTEMS AND METHODS FOR SELECTING IDENTIFIERS FOR WIRELESS ACCESS POINTS

(71) Applicant: Symantec Corporation, Mountain View, CA (US)

(72) Inventors: Kevin Jiang, Waltham, MA (US); Matt Boucher, Merrimack, NH (US); Michael Shavell, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 100 days.

(21) Appl. No.: 14/868,329

(22) Filed: Sep. 28, 2015

(51) Int. Cl.
*H04L 1/00* (2006.01)
*H04L 29/12* (2006.01)
*H04W 64/00* (2009.01)
*H04W 48/10* (2009.01)
*H04W 4/02* (2009.01)

(52) U.S. Cl.
CPC ...... *H04L 61/3015* (2013.01); *H04L 61/3075* (2013.01); *H04W 4/023* (2013.01); *H04W 48/10* (2013.01); *H04W 64/003* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,924,793 | B2* | 4/2011 | Savoor | H04L 41/0896 370/254 |
| 8,483,718 | B2* | 7/2013 | Hwang | H04W 8/08 455/436 |
| 9,288,751 | B2* | 3/2016 | Finkelstein | H04W 48/20 |
| 9,479,997 | B2* | 10/2016 | Scahill | H04W 76/021 |
| 2010/0008235 | A1* | 1/2010 | Tinnakornsrisuphap | H04L 29/12264 370/241 |
| 2010/0067406 | A1* | 3/2010 | Suzuki | H04W 48/16 370/254 |

OTHER PUBLICATIONS

Beal, Vangie, "SSID—service set identifier", http://www.webopedia.com/Term/S/SSID.html, as accessed Sep. 2, 2015, (Aug. 6, 2002).
"Wigle", https://wigle.net/, as accessed Sep. 2, 2015, (Oct. 22, 1999).
Kevin Jiang, et al.; Systems and Methods for Preventing Tracking of Mobile Devices; U.S. Appl. No. 14/862,181, filed Sep. 23, 2015.

* cited by examiner

*Primary Examiner* — Frank Duong
(74) *Attorney, Agent, or Firm* — FisherBroyles LLP

(57) ABSTRACT

The disclosed computer-implemented method for selecting identifiers for wireless access points may include (1) receiving a request to establish an identifier for a configurable wireless access point, (2) identifying an existing access-point identifier that is used to identify at least one additional wireless access point, (3) determining a physical location of the configurable wireless access point, (4) verifying that the existing access-point identifier is not being used within a predetermined proximity of the physical location of the configurable wireless access point, and (5) assigning the existing access-point identifier to the configurable wireless access point. Various other methods, systems, and computer-readable media are also disclosed.

20 Claims, 7 Drawing Sheets

SYSTEMS AND METHODS FOR SELECTING IDENTIFIERS FOR WIRELESS ACCESS POINTS

BACKGROUND

Individuals and organizations frequently maintain wireless networks in order to provide on-the-go connectivity for themselves and others. Wireless access points traditionally use an identifier, such as a service set identifier (SSID), to help direct wireless network traffic to the appropriate destination, especially when there are multiple access points that are within signal range of each other. Devices may connect to a particular access point by listening for identifier broadcasts and attaching an identifier used by that access point to network packets bound for a network managed by the access point. In cases where the access point does not broadcast an identifier, a device that already is aware of the proper identifier to use may still be able to locate and connect to the access point by transmitting probe requests for the network.

Unfortunately, devices may inadvertently give away identifying information when they probe for networks. Once a device is aware of a particular network identifier, it may regularly broadcast probe requests in an attempt to locate the associated network. Hackers or other malicious entities may sniff data from these probe requests and/or network packets being transmitted by the device. Malicious entities may then be able to use these sniffed identifiers in conjunction with publicly available information to derive information about the owner of the device, such as a home address. Accordingly, the instant disclosure identifies and addresses a need for improved systems and methods for selecting wireless access point identifiers.

SUMMARY

As will be described in greater detail below, the instant disclosure describes various systems and methods for selecting identifiers for wireless access points by searching for a commonly used identifier and then verifying that the chosen identifier is not in use by other access points nearby. In one example, a computer-implemented method for selecting identifiers for wireless access points may include (1) receiving a request to establish an identifier for a configurable wireless access point, (2) identifying an existing access-point identifier that is used to identify at least one additional wireless access point, (3) determining a physical location of the configurable wireless access point, (4) verifying that the existing access-point identifier is not being used within a predetermined proximity of the physical location of the configurable wireless access point, and (5) assigning the existing access-point identifier to the configurable wireless access point.

In some examples, the computer-implemented method may also include assigning both a public identifier and a secret identifier to the configurable wireless access point. The configurable wireless access point may broadcast the public identifier to enable wireless devices to find and access the configurable wireless access point. The configurable wireless access point may not broadcast the secret identifier, which may enable wireless devices that were previously provided with the secret identifier to access the configurable wireless access point.

In one embodiment, the computer-implemented method may include retrieving, from a database of access-point identifiers, a list of identifiers that are in use within a larger predetermined proximity of the physical location of the configurable wireless access point, the larger predetermined proximity being larger than the predetermined proximity within which the existing access-point identifier is not being used. The computer-implemented method may also include selecting a frequently-used access-point identifier that appears the greatest number of times on a list of access-point identifiers as the existing access-point identifier.

Additionally or alternatively, identifying the existing access-point identifier may include identifying a set of existing access-point identifiers that exist within a predetermined region. Each existing access-point identifier selected as part of the set may appear in the predetermined region with a frequency that exceeds a predetermined frequency threshold. The computer-implemented method may then include selecting the existing access-point identifier from this set of existing access-point identifiers. In some examples, the computer-implemented method may include filtering the set of existing access-point identifiers in order to prevent predetermined text from being selected as part of the existing access-point identifier.

In some embodiments, verifying that the existing access-point identifier is not being used within a predetermined proximity of the physical location of the configurable wireless access point may include retrieving a list of access-point identifiers that are in use within the predetermined proximity of the physical location of the configurable wireless access point and then verifying that the existing access-point identifier is not on the list of access-point identifiers that are in use within the predetermined proximity. Additionally or alternatively, verifying the existing access-point identifier may include listening for broadcasts of access-point identifiers and verifying that broadcasts of the existing access-point identifier are not detectable at the configurable wireless access point. The verification process may additionally or alternatively include probing, from the configurable wireless access point, for networks that use the existing access-point identifier.

The computer-implemented method may further include confirming that the existing access-point identifier is not being used within a predetermined proximity of the physical location of the configurable wireless access point. This confirmation may occur in response to (1) a change in the physical location of the configurable wireless access point, (2) detecting a broadcasted access point identifier that was not detected during a previous verification of the existing access-point identifier, (3) determining that a predetermined period of time has elapsed since the existing access point identifier was last verified, and/or (4) a user-initiated request to repeat the verification of the existing access-point identifier.

In some examples, determining the physical location of the configurable wireless access point may include (1) determining the physical location of a network address assigned to the configurable wireless access point, (2) receiving geolocation information from a geolocation device connected to the configurable wireless access point, and/or (3) receiving location information from a user of the configurable wireless access point.

In one embodiment, the configurable wireless access point may perform the receiving, determining, identifying, and verifying, and assigning steps of the computer-implemented method. In such an embodiment, the configurable wireless access point may identify the existing access-point identifier by retrieving a list of access-point identifiers that are in use within a large proximity of the physical location of the configurable wireless access point, the large proximity being larger than the predetermined proximity. The configurable wireless access point may verify that the existing access-point identifier is not being used within the predetermined proximity of the physical location of the configurable wireless access point by, for example, (1) listening for broadcasts of access-point identifiers and/or probing for networks that use the existing access-point identifier and (2) determining that no networks within the predetermined proximity of the physical location use the existing access-point identifier.

In one embodiment, a system for implementing the above-described method may include (1) a receiving module, stored in memory, that receives a request to establish an identifier for a configurable wireless access point, (2) an identification module, stored in memory, that identifies an existing access-point identifier that is used to identify at least one additional wireless access point, (3) a determination module, stored in memory, that determines a physical location of the configurable wireless access point, (4) a verifying module, stored in memory, that verifies that the existing access-point identifier is not being used within a predetermined proximity of the physical location of the configurable wireless access point, (5) an assigning module, stored in memory, that assigns the existing access-point identifier to the configurable wireless access point, and (6) at least one physical processor configured to execute the receiving module, the identification module, the determination module, the verifying module, and the assigning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a request to establish an identifier for a configurable wireless access point, (2) identify an existing access-point identifier that is used to identify at least one additional wireless access point, (3) determine a physical location of the configurable wireless access point, (4) verify that the existing access-point identifier is not being used within a predetermined proximity of the physical location of the configurable wireless access point, and (5) assign the existing access-point identifier to the configurable wireless access point.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
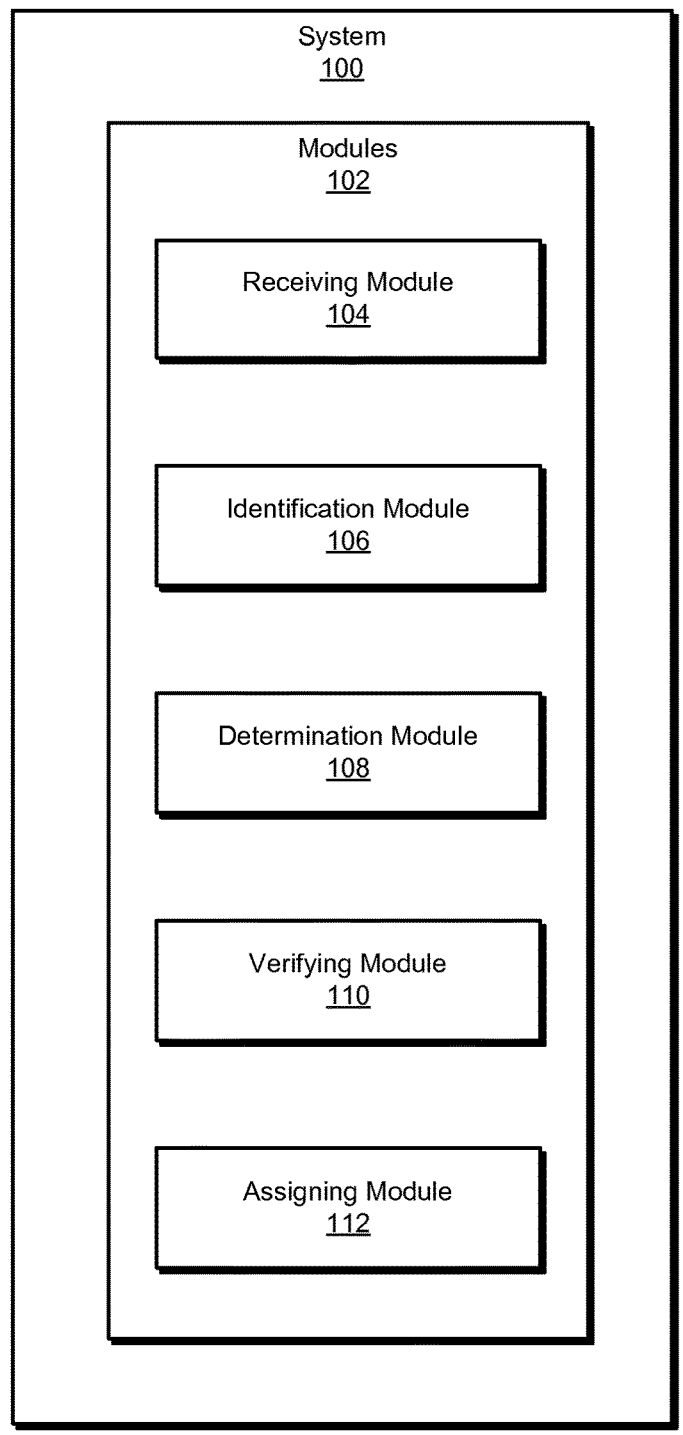
FIG. 1 is a block diagram of an exemplary system for selecting identifiers for wireless access points.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selecting identifiers for wireless access points. As will be explained in greater detail below, systems and methods described herein may search a wide area for a commonly used access-point identifier and verify that using this identifier for a particular access point will not conflict with identifiers used by other nearby access points. By selecting an access-point identifier in this manner, systems and methods described herein may help devices that connect to the access point from revealing potentially identifying information about users of the devices and/or the access points.

Figure 2:
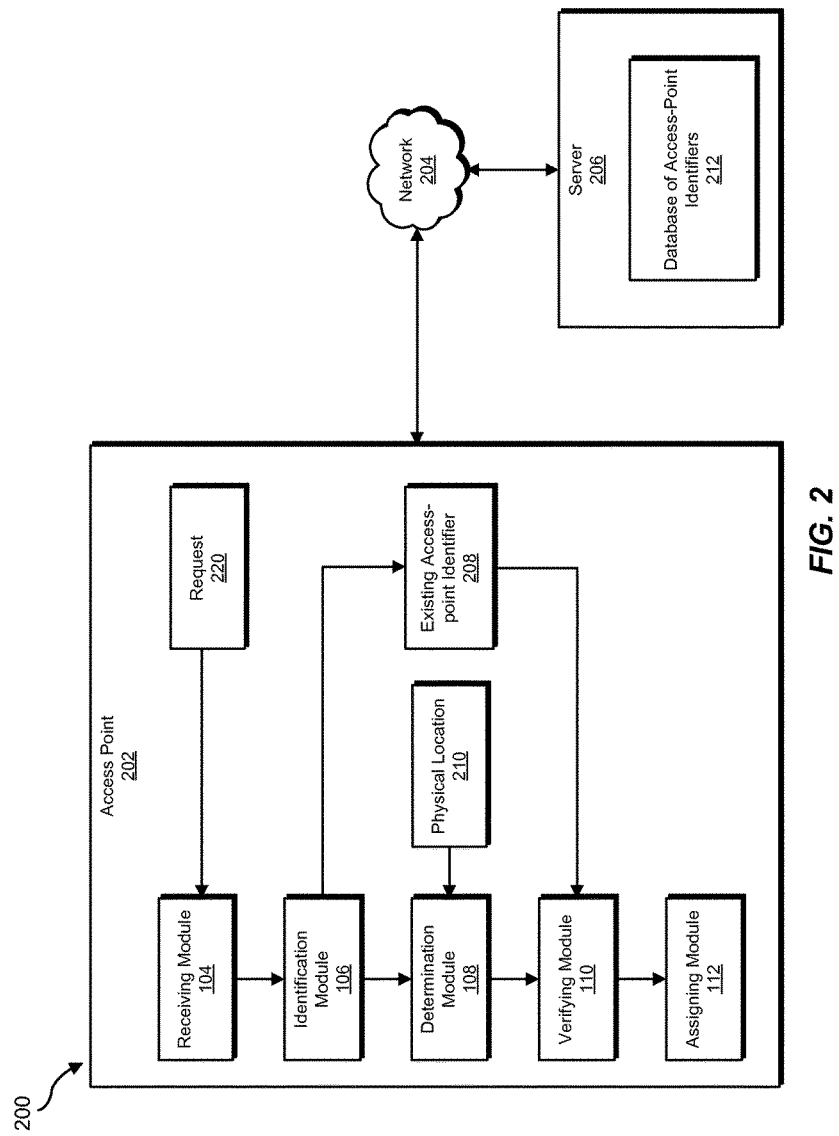
FIG. 2 is a block diagram of an additional exemplary system for selecting identifiers for wireless access points.

The following will provide, with reference to FIGS. 1-2, detailed descriptions of exemplary systems for selecting identifiers for wireless access points. Detailed descriptions of corresponding computer-implemented methods will also be provided in connection with FIG. 3. Further detailed descriptions of exemplary systems for selecting identifiers will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for selecting identifiers for wireless access points. As illustrated in this figure, exemplary system 100 may include one or more modules 102 for performing one or more tasks. For example, and as will be explained in greater detail below, exemplary system 100 may include a receiving module 104 that receives a request to establish an identifier for a configurable wireless access point. Exemplary system 100 may additionally include an identification module 106 that identifies an existing access-point identifier that is used to identify at least one additional wireless access point. Exemplary system 100 may further include a determination module 108 that determines a physical location of the configurable wireless access point. Moreover, exemplary system 100 may include a verifying module 110 that verifies that the existing access-point identifier is not being used within a predetermined proximity of the physical location of the configurable wireless access point. Exemplary system 100 may also include an assigning module 112 that assigns the existing access-point identifier to the configurable wireless access point. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., access point 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include an access point 202 in communication with a server 206 via a network 204. In one example, access point 202 may be programmed with one or more of modules 102. Additionally or alternatively, server 206 may be programmed with one or more of modules 102. For example, server 206 may, in some embodiments, be programmed with all of modules 102 in order to provide access-point identifier selection services to many different configurable wireless access points. In such an example, server 206 may receive request 220 and physical location 210 of access point 202 via network 204. Server 206 may then return a verified existing access-point identifier to access point 202.

In one embodiment, one or more of modules 102 from FIG. 1 may, when executed by at least one processor of access point 202 and/or server 206, enable access point 202 and/or server 206 to select an access-point identifier that is common enough to be non-identifying, but unique enough to not cause conflicts with other nearby access points. For example, and as will be described in greater detail below, receiving module 104 may receive a request 220 to establish an identifier for an access point 202. Identification module 106 may identify an existing access-point identifier 208 that is used to identify at least one additional wireless access point (e.g., access point 416 in FIG. 4). Determination module 108 may determine a physical location 210 of the configurable wireless access point. Verifying module 110 may then verify that existing access-point identifier 208 is not being used within a predetermined proximity of physical location 210 of access point 202. Assigning module 112 may assign existing access-point identifier 208 to access point 202.

Access point 202 generally represents any type or form of computing device capable of managing wireless network connections between wireless-enabled devices and a wired network (e.g., a Local Area Network, or LAN). Examples of access point 202 include, without limitation, wireless routers, standalone access points, combinations of one or more of the same, exemplary computing system 610 in FIG. 6, or any other suitable computing device. Access point 202 may be a configurable wireless access point. In other words, access point 202 may be able to modify its internal settings in response to a variety of inputs, such as a configuration command from assigning module 112, as will be described in detail below. Such settings may include the communication standard used by the access point, the name of the access point, a service set identifier (SSID) used by the access point, some other kind of identifier used by the access point, or any other settings that control how the access point behaves.

Server 206 generally represents any type or form of computing device that is capable of managing a database of access-point identifiers. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between access point 202 and server 206.

Figure 3:
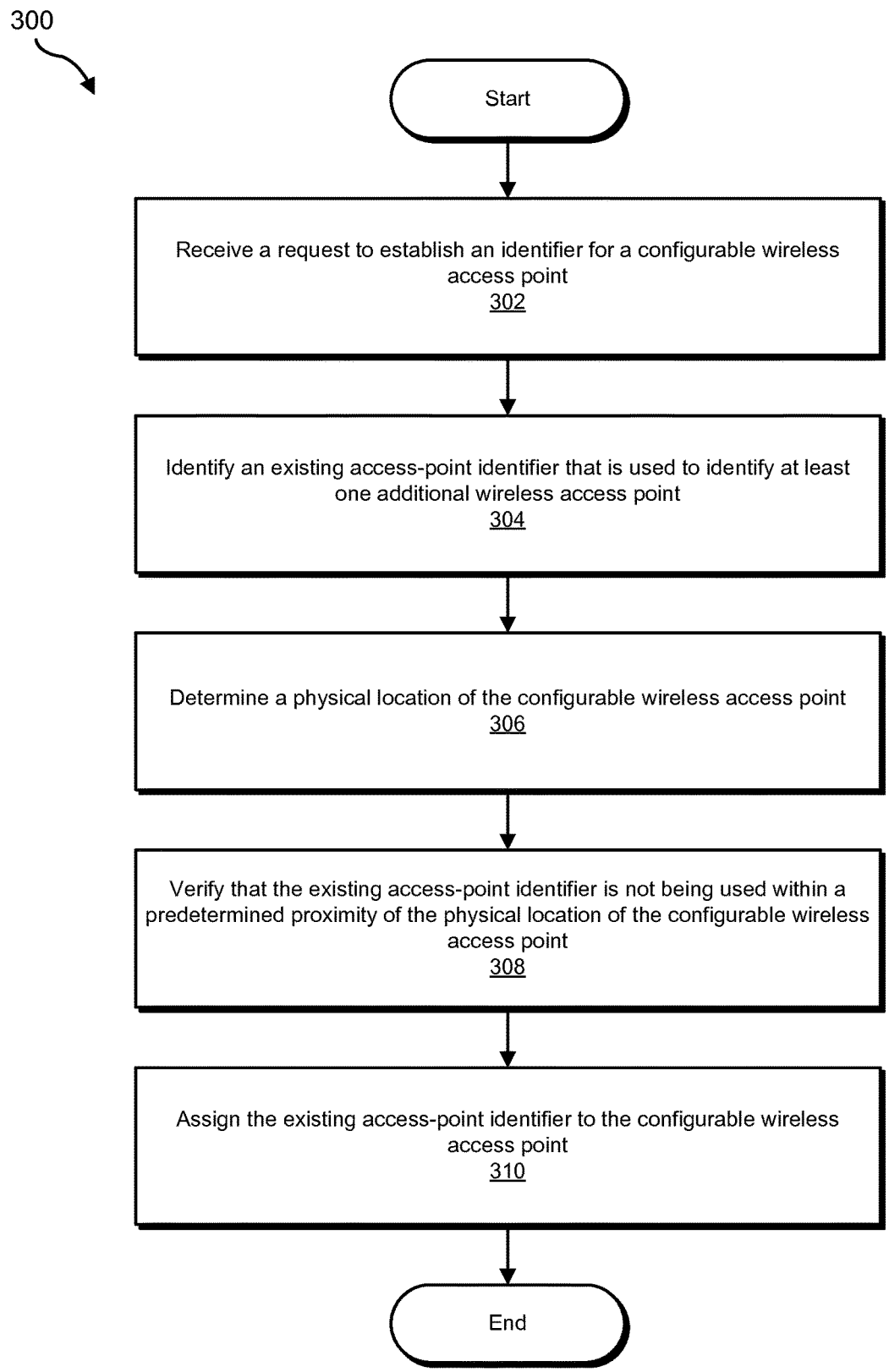
FIG. 3 is a flow diagram of an exemplary method for selecting identifiers for wireless access points.

FIG. 3 is a flow diagram of an exemplary computer-implemented method 300 for selecting identifiers for wireless access points. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may receive a request to establish an identifier for a configurable wireless access point. For example, receiving module 104 may, as part of access point 202 in FIG. 2, receive request 220 to establish an identifier for access point 202.

Receiving module 104 may receive request 220 in a variety of contexts. As illustrated in FIG. 2, receiving module 104 may be executed by computing hardware integrated with access point 202 and receive request 220 from other code within access point 202. In some embodiments that are not illustrated, one or more of modules 102, including receiving module 104, may be executed by computing hardware that is not integrated with access point 202. For example, receiving module 104 may execute as part of a device that connects to an access point in order to assign an identifier to the access point. As a specific example, receiving module 104 may operate as part of a remote server or network service provider that provides remote configuration services for configurable wireless access points.

The terms "access-point identifier" and "identifier," as used herein, generally refer to any character string (e.g., an alphanumeric string) used to identify a wireless access point. Devices that are attempting to communicate with the wireless access point may attach this identifier to network packets and/or probe requests intended for the wireless access point. In some examples, the identifier may be a service set identifier, or SSID. Additionally or alternatively, an identifier may be a name used to identify a particular network served by the wireless access point.

At step 304, one or more of the systems described herein may identify an existing access-point identifier that is used to identify at least one additional wireless access point. For example, identification module 106 may, as part of access point 202 in FIG. 2, identify existing access-point identifier 208 that is used to identify at least one additional wireless access point.

Identification module 106 may identify the existing access-point identifier in a variety of ways. For example, identification module 106 may identify a set of existing access-point identifiers that exist within a predetermined region. This region may or may not be proximate to access point 202. For example and as will be described in greater detail below, determination module 108 may determine the physical location of access point 202. Identification module 106 may use this location information to identify a set of existing access-point identifiers that exist within a certain radius of access point 202. Additionally or alternatively, identification module 106 may identify a set of existing access-point identifiers that exist within a pre-specified geographic region, such as "access-point identifiers in Mountain View, Calif." In one embodiment, identification module 106 may retrieve, from a database of access-point identifiers (e.g., database of access-point identifiers 212 in FIG. 2) that stores access-point identifiers in conjunction with a physical location at which the identifier is known to exist, a list of identifiers that are in use within a large predetermined proximity of the physical location of the configurable wireless access point. The database of access-point identifiers may be a publicly accessible database (e.g., WIGLE.NET). Alternatively, the database may be managed by a private organization.

Figure 4:
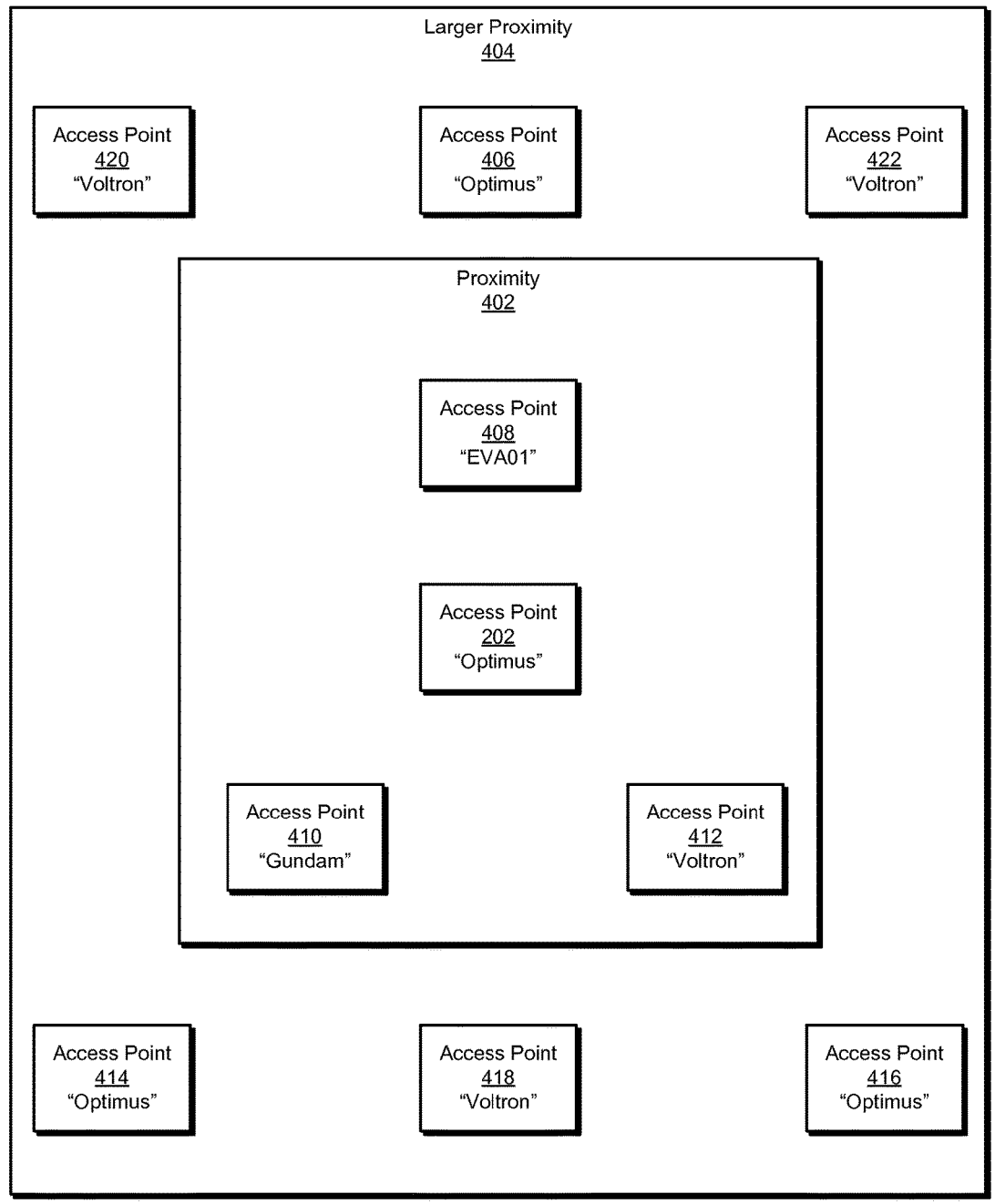
FIG. 4 is a block diagram of an exemplary arrangement of wireless network access points.

An example of various access-point identifiers used across a region is shown in connection with FIG. 4. As illustrated, access point 202 may exist within varying proximities of other access points. In particular, access point 202 may be surrounded by nearby access points within a proximity 402. Other access points may exist within a larger proximity 404 that is larger than and encompasses proximity 402. Proximity 402 may be defined as the range at which access point 202 is able to listen for and/or probe for other networks. Access points 408, 410, and 412 may exist within proximity 402 of access point 202, while access points 406, 414, 416, 418, 420, and 422 may exist within larger proximity 404 of access point 202. Some access points may use the same identifier as other access points. For example, access point 412 and access point 422 both use the identifier, "Voltron."

Identification module 106 may query a public database for access point identifiers being used within larger proximity 404. Identification module 106 may identify the identifier, "Optimus" from access point 406, "EVA01" from access point 408, "Gundam" from access point 410, "Voltron" from access point 412, etc. Identification module 106 may then store the results of its query in a database, such as database of access-point identifiers 212 in FIG. 2. Additionally or alternatively, identification module 106 may maintain a local database of access-point identifiers.

Once identification module 106 has obtained a collection of access-point identifiers, identification module 106 may analyze the collection in order to choose a suitable access-point identifier. Identification module 106 may use any sort of analytic and/or statistical method to select a suitable access-point identifier. For example, identification module 106 may convert the retrieved access-point identifier information into a ranked list that details a list of identifiers along with a frequency score, such as the list shown as part of database of access-point identifiers 212 in FIG. 5. Identification module 106 may identify the existing access-point identifier by selecting a frequently-used access-point identifier that appears the greatest number of times on a list of access-point identifiers (e.g., "Voltron" in FIG. 5). Alternatively, identification module 106 may randomly select an access-point identifier that appears in the collection with a frequency that exceeds a predetermined frequency threshold.

In some examples, systems described herein may filter the collection of existing access-point identifiers in order to prevent predetermined text from being selected as part of the existing access-point identifier. Users may wish to prevent certain text, such as profanity, from being selected as part of an access-point identifier. Accordingly, identification module 106 may, for example, allow users to define a black list of words, regular expressions that describe undesirable text patterns, or any other definition of text that a user may wish to prevent from being included in an access-point identifier. For example, identification module 106 may filter out any access-point identifiers that contain text strings that are found on a black list from the above-described collection of access-point identifiers.

As will be described in greater detail below, identification module 106 may, in some examples, select more than one access-point identifier for verification. For example, if the first access-point identifier selected by identification module 106 fails the below-described verification step, identification module 106 may remove all instances of the failed access-point identifier from the collection of access-point identifiers and then repeat the selection process. Furthermore, in some embodiments, one or more of modules 102 may present multiple selected and verified access-point identifiers to a user as potential options for use by access point 202.

Modules 102 may need to know the location of access point 202 in order to properly verify that using the selected access-point identifier(s) will not cause conflicts for users. Accordingly, at step 306 in FIG. 3, one or more of the systems described herein may determine a physical location of the configurable wireless access point. For example, determination module 108 may, as part of access point 202 in FIG. 2, determine physical location 210 of access point 202.

Determination module 108 may determine the physical location of access point 202 in a variety of ways. For example, determination module 108 may utilize Internet Protocol (IP) geolocation to determine the location of an IP address assigned to access point 202. Additionally or alternatively, determination module 108 may receive geolocation information from geolocation hardware (e.g., a Global Positioning System, or GPS, device) that is either incorporated into or connected to access point 202. Determination module 108 may even receive location information by prompting a user to input location information.

At step 308 in FIG. 3, one or more of the systems described herein may verify that the existing access-point identifier is not being used within a predetermined proximity of the physical location of the configurable wireless access point. For example, verifying module 110 may, as part of access point 202 in FIG. 2, verify that existing access-point identifier 208 is not being used within a predetermined proximity of physical location 210 of the configurable wireless access point.

Verifying module 110 may verify existing access-point identifier 208 in a variety of ways. For example, verifying module 110 may retrieve a list of access-point identifiers that are in use within the predetermined proximity of access point 202. This list of access-point identifiers may come from a variety of sources, including but not limited to public databases (e.g., WIGLE.NET) and/or privately managed databases. Verifying module 110 may then verify that the selected existing access-point identifier is not on the list of identifiers that are being used within proximity to access point 202.

Additionally or alternatively, verifying module 110 may search for nearby networks through access point 202. For example, verifying module 110 may, as part of access point 202, listen for identifier broadcasts from other access points. Additionally or alternatively, verifying module 110 may, through access point 202, probe for networks using the existing access-point identifier. Verifying module 110 may then verify that the selected existing access-point identifier is not detectable and/or not findable from access point 202.

With reference to FIG. 4, verifying module 110 may search proximity 402 for access-point identifiers that conflict with the existing access-point identifier chosen by identification module 106. Proximity 402 may be defined in a variety of ways and contexts. For example, verifying module 110 may search a publicly accessible database of access-point identifiers for identifiers in use within a specified geographic distance of access point 202. In such examples, proximity 402 may be a defined radius within which to search. Additionally or alternatively, verifying module 110 may cause access point 202 to probe and/or listen for wireless networks. In these examples, proximity 402 may be defined by the range at which access point 202 can interact with other access points. This range may be dependent on a number of factors, including but not limited to the presence of physical objects, radio-frequency interference, repeaters, etc. As the physical environment around access point 202 changes, so too might the range at which it can probe for and/or detect other networks change.

Verifying module 110 may discover that the identifier chosen by identification module 106 is being used by another nearby access point. For example, identification module 106 may select the identifier, "Voltron", for use by access point 202, verifying module 110 may detect that "Voltron" is in use within proximity 402 by access point 412, as illustrated in FIG. 4. Should this occur, verifying module 110 may inform identification module 106 that the selected identifier is invalid and cause identification module 106 to repeat the selection process, this time rejecting the previously selected identifier as invalid for use by access point 202.

Figure 5:
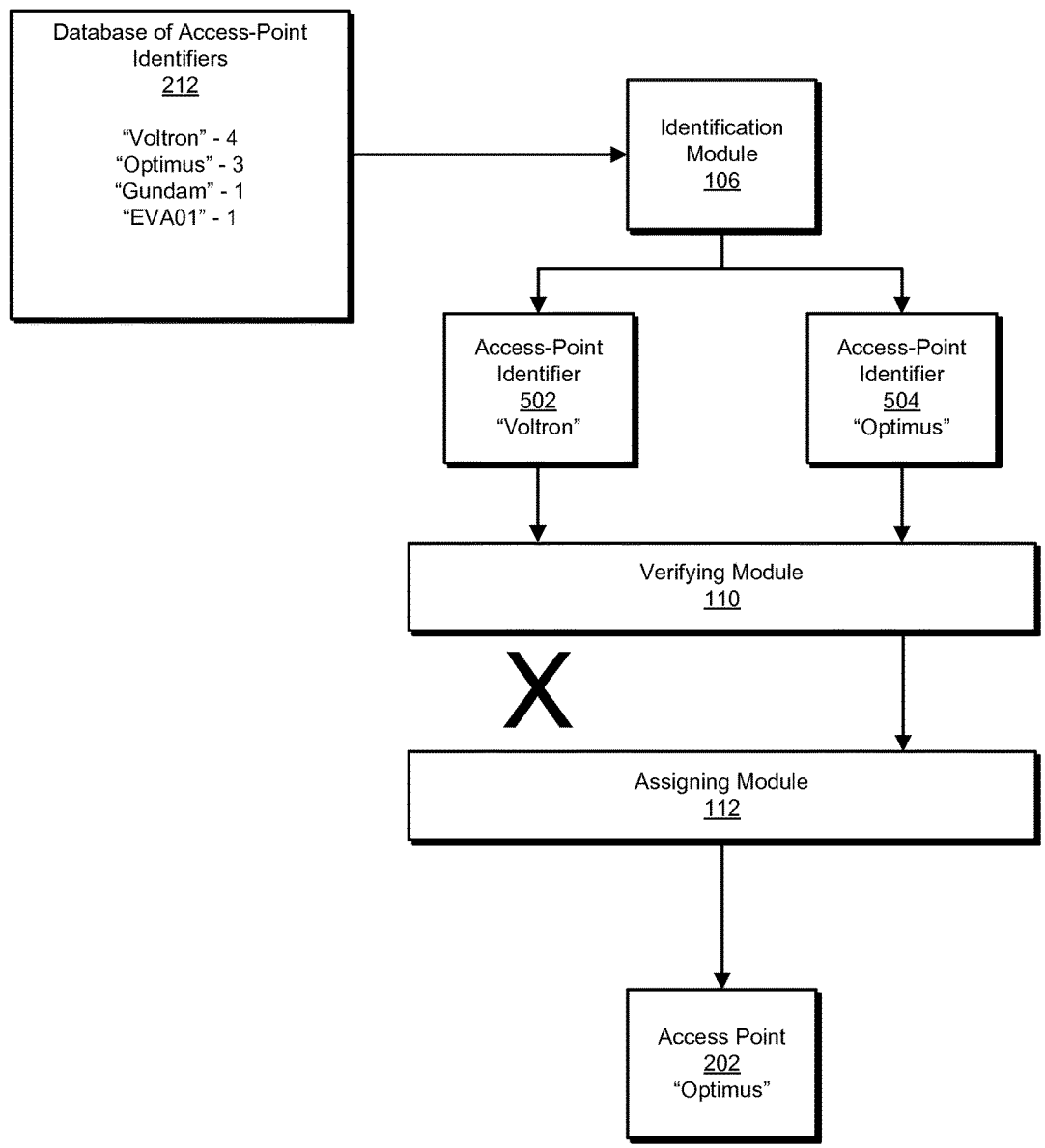
FIG. 5 is a block diagram of an exemplary computing system for selecting identifiers for wireless access points.

An example of this selection and verification process is provided with reference to FIG. 5. Identification module 106 may retrieve identifiers found in proximity 404 (illustrated in FIG. 4) from a public database of identifiers, and use these discovered identifiers to populate database of access-point identifiers 212. As shown in FIG. 5, identification module 106 may discover that the identifier, "Voltron" is used four times within proximity 404, while "Optimus" is used three times, "Gundam" one time, and "EVA01" one time. As described above, identification module 106 may determine which identifier to select in a variety of ways. In the example of FIG. 5, identification module 106 may simply select the most common access-point identifier for verification by verifying module 110. As shown in FIG. 5, identification module 106 may accordingly pass an access-point identifier 502 of "Voltron" to verifying module 110.

Unfortunately and as illustrated in FIG. 4, the access-point identifier "Voltron" is in use by access point 412, which is within proximity 402 of access point 202. Verifying module 110 may accordingly reject "Voltron" for use as an identifier by access point 202 and prompt identification module 106 to select a new access-point identifier. As illustrated in FIG. 5, identification module 106 may identify an additional access-point identifier 504, "Optimus" as the second-most frequent option discovered while searching proximity 404. Identification module 106 may then present access-point identifier 504 for verification by verifying module 110. As shown in FIG. 4, there are no access points within proximity 402 of access point 202 that use the identifier, "Optimus". Verifying module 110 may accordingly pass access-point identifier 504 to assigning module 112, which may configure access point 202 to use the identifier, "Optimus".

Even in cases where verifying module 110 initially approves an access-point identifier for use by access point 202, verifying module 110 may repeat verifying the access-point identifier of access point 202. This re-verification may occur after the initial selection of an identifier. For example, verifying module 110 may confirm that the existing wireless access-point identifier assigned to access point 202 is not in use within proximity to access point 202 in response to a variety of triggers. Such triggers may include a change in the physical location of the configurable wireless access point, detecting a broadcasted access point identifier that was not detected during a previous verification of the existing access-point identifier, determining that a predetermined period of time has elapsed since the existing access point identifier was last verified (e.g., "repeat verification every seven days"), and/or a user-initiated request to repeat the verification process.

Returning to FIG. 3 at step 310, one or more of the systems described herein may assign the existing access-point identifier to the configurable wireless access point. For example, assigning module 112 may, as part of access point 202 in FIG. 2, assign existing access-point identifier 208 to the configurable wireless access point.

Assigning module 112 may perform a variety of actions as part of assigning an access-point identifier to access point 202. As a basic example, assigning module 112 may simply configure access point 202 to use the identified and verified existing access-point identifier (e.g., "Optimus" in FIGS. 4 and 5). Additionally or alternatively, assigning module 112 may provide the verified existing access-point identifier to a user interface for user approval before assigning the identifier to access point 202. Similarly, in cases where systems and methods described herein identify and verify multiple access-point identifiers, assigning module 112 may present some or all of these identifiers to a user via a user interface. For example, identification module 106 and verifying module 110 may respectively identify and verify several potential identifiers for use by access point 202. Assigning module 112 may present these verified potential identifiers to a user. Once the user makes their selection, assigning module 112 may assign the identifier chosen by the user to access point 202.

In some examples, systems and methods described herein may assign multiple identifiers to access point 202. For example, systems and methods described herein may identify, verify, and assign a public identifier and a secret identifier to the configurable wireless access point. In such examples, the configurable wireless access point broadcasts the public identifier to enables wireless devices to find and access the configurable wireless access point. Moreover, in this example, the configurable wireless access point does not broadcast the secret identifier, and this secret identifier enables wireless devices that were previously provided with the secret identifier to access the configurable wireless access point. Both the public and secret identifiers may be selected using the identification and verification processes described above.

Although the above-described systems and methods could be executed by any sort of appropriate computing system, in some embodiments, the access point that requires an access-point identifier executes all of modules 102 and performs the receiving, determining, identifying, verifying, and assigning steps. Specifically, access point 202 may execute modules 102 in order to obtain an appropriate access-point identifier. In such embodiments, access point 202 may identify the existing access-point identifier by retrieving a list of identifiers that are in use within a large proximity of its physical location and then verify that the existing access-point identifier is not being used within a smaller proximity of access point 202. Access point 202 may accomplish this verification process by listening for broadcasts from other access points and/or probing for networks that use the selected identifier. Once access point 202 determines that no other networks within close proximity of its physical location use the selected existing access-point identifier, access point 202 may configure itself to use the existing access-point identifier.

As described in greater detail above, systems and methods described herein may determine a suitable identifier for a wireless access point by searching a broad area for a commonly used access-point identifier and then verify that the identifier is not being used by other wireless access points near the first access point. By selecting an identifier in this manner, the systems and methods described herein may provide an access-point identifier that is sufficiently unique to be useful, but common enough to prevent wireless devices that connect to the access point from inadvertently giving away identifying potentially sensitive information without the need for any special action on the end user's part.

Figure 6:
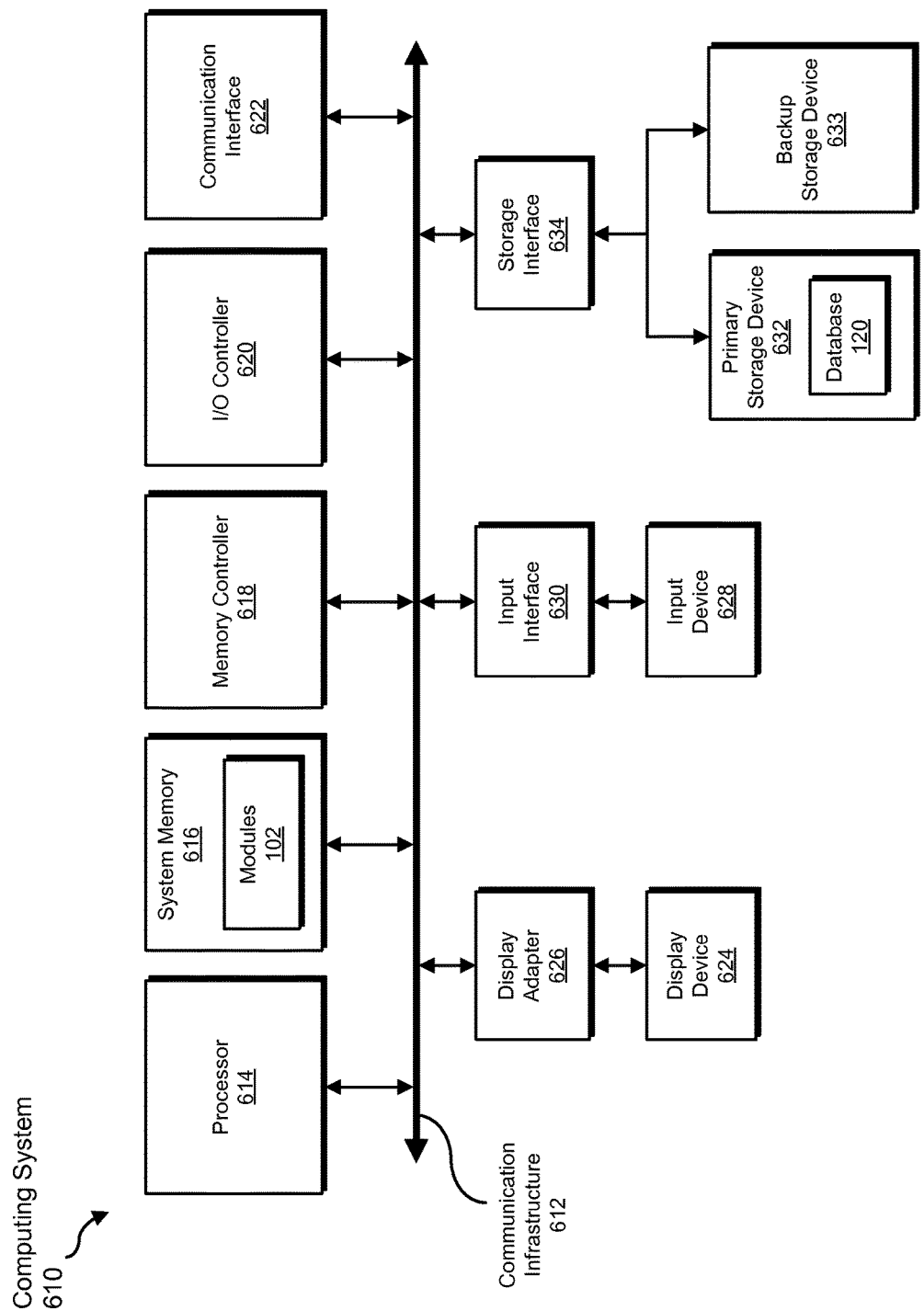
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
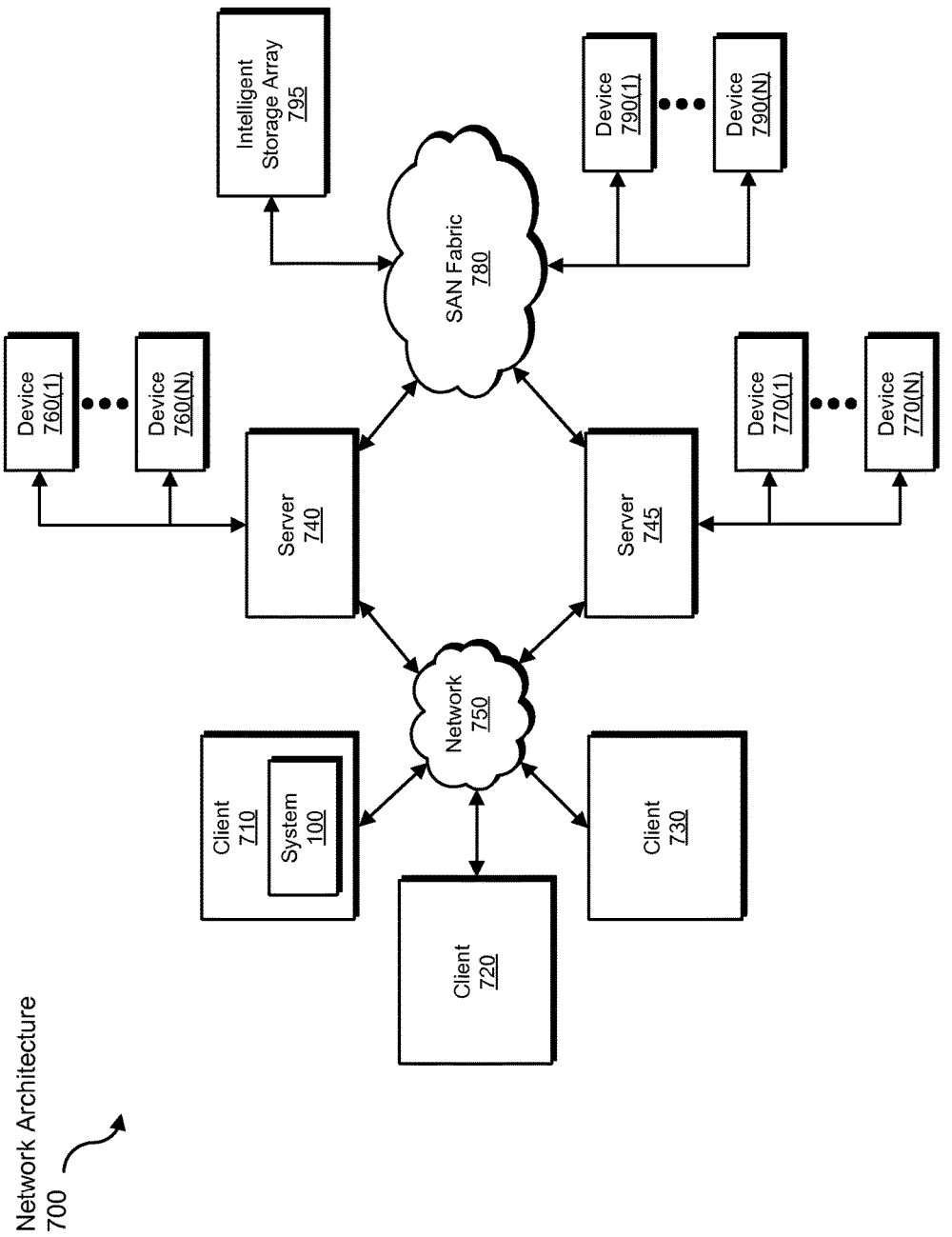
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for selecting identifiers for wireless access points.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive access-point identifier information to be transformed, transform the information into a ranked list of access-point identifiers that are used within a specific region, use the ranked list to select an identifier, receive additional access-point identifier information, compare the selected identifier to the additional access-point identifier information, use a result of the comparison to confirm that the selected identifier is not being used nearby to the configurable wireless access point, and assign the selected identifier to the access point based on a result of the comparison. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selecting identifiers for wireless access points, at least a portion of the method being performed by a computing device comprising at least one processor, the method comprising:
   receiving a request to establish an identifier for a configurable wireless access point;
   identifying an existing access-point identifier that is used to identify at least one additional wireless access point;
   determining a physical location of the configurable wireless access point;
   verifying that the existing access-point identifier is not being used within a predetermined proximity of the physical location of the configurable wireless access point;
   assigning the existing access-point identifier to the configurable wireless access point.

2. The method of claim 1, further comprising assigning a public identifier and a secret identifier to the configurable wireless access point wherein:
   the configurable wireless access point broadcasts the public identifier to enables wireless devices to find and access the configurable wireless access point;
   the configurable wireless access point does not broadcast the secret identifier, and the secret identifier enables wireless devices that were previously provided with the secret identifier to access the configurable wireless access point.

3. The method of claim 1, further comprising retrieving, from a database of access-point identifiers, a list of identifiers that are in use within a larger predetermined proximity of the physical location of the configurable wireless access point, the larger predetermined proximity being larger than the predetermined proximity within which the existing access-point identifier is not being used.

4. The method of claim 1, wherein identifying the existing access-point identifier comprises selecting a frequently-used access-point identifier that appears the greatest number of times on a list of access-point identifiers.

5. The method of claim 1, wherein identifying the existing access-point identifier comprises:
   identifying a set of existing access-point identifiers that exist within a predetermined region, where each existing access-point identifier in the set appears in the predetermined region with a frequency that exceeds a predetermined frequency threshold;
selecting the existing access-point identifier from the set of existing access-point identifiers.

6. The method of claim 5, further comprising filtering the set of existing access-point identifiers in order to prevent predetermined text from being selected as part of the existing access-point identifier.

7. The method of claim 1, wherein verifying that the existing access-point identifier is not being used within a predetermined proximity of the physical location of the configurable wireless access point comprises:
retrieving, from a database of access-point identifiers, a list of access-point identifiers that are in use within the predetermined proximity of the physical location of the configurable wireless access point;
verifying that the existing access-point identifier is not on the list of access-point identifiers that are in use within the predetermined proximity.

8. The method of claim 1, wherein verifying that the existing access-point identifier is not being used within a predetermined proximity of the physical location of the configurable wireless access point comprises:
listening, at the configurable wireless access point, for broadcasts of access-point identifiers;
verifying that broadcasts of the existing access-point identifier are not detectable at the configurable wireless access point.

9. The method of claim 1, wherein verifying that the existing access-point identifier is not being used within a predetermined proximity of the physical location of the configurable wireless access point comprises probing, from the configurable wireless access point, for networks that use the existing access-point identifier.

10. The method of claim 1, further comprising confirming that the existing access-point identifier is not being used within a predetermined proximity of the physical location of the configurable wireless access point in response to at least one of:
a change in the physical location of the configurable wireless access point;
detecting a broadcasted access point identifier that was not detected during a previous verification of the existing access-point identifier;
determining that a predetermined period of time has elapsed since the existing access point identifier was last verified;
a user-initiated request to repeat the verification of the existing access-point identifier.

11. The method of claim 1, wherein determining the physical location of the configurable wireless access point comprises at least one of:
determining the physical location of a network address assigned to the configurable wireless access point;
receiving geolocation information from a geolocation device connected to the configurable wireless access point;
receiving location information from a user of the configurable wireless access point.

12. The method of claim 1, wherein the configurable wireless access point:
performs the receiving, determining, identifying, and verifying, and assigning steps;
identifies the existing access-point identifier by retrieving, from a database of access-point identifiers, a list of access-point identifiers that are in use within a large proximity of the physical location of the configurable wireless access point, the large proximity being larger than the predetermined proximity;
verifies that the existing access-point identifier is not being used within a predetermined proximity of the physical location of the configurable wireless access point by:
listening, at the configurable wireless access point, for broadcasts of access-point identifiers;
probing for networks that use the existing access-point identifier;
determining that no networks within the predetermined proximity of the physical location use the existing access-point identifier.

13. A system for selecting identifiers for wireless access points, the system comprising:
a receiving module, stored in memory, that receives a request to establish an identifier for a configurable wireless access point;
an identification module, stored in memory, that identifies an existing access-point identifier that is used to identify at least one additional wireless access point;
a determination module, stored in memory, that determines a physical location of the configurable wireless access point;
a verifying module, stored in memory, that verifies that the existing access-point identifier is not being used within a predetermined proximity of the physical location of the configurable wireless access point;
an assigning module, stored in memory, that assigns the existing access-point identifier to the configurable wireless access point;
at least one physical processor configured to execute the receiving module, the identification module, the determination module, the verifying module, and the assigning module.

14. The system of claim 13, wherein the assigning module assigns a public identifier and a secret identifier to the configurable wireless access point such that:
the configurable wireless access point broadcasts the public identifier to enables wireless devices to find and access the configurable wireless access point;
the configurable wireless access point does not broadcast the secret identifier, and the secret identifier enables wireless devices that were previously provided with the secret identifier to access the configurable wireless access point.

15. The system of claim 13, wherein the identification module retrieves, from a database of access-point identifiers, a list of identifiers that are in use within a larger predetermined proximity of the physical location of the configurable wireless access point, the larger predetermined proximity being larger than the predetermined proximity within which the existing access-point identifier is not being used.

16. The system of claim 13, wherein the identification module identifies the existing access-point identifier by selecting a frequently-used access-point identifier that appears the greatest number of times on a list of access-point identifiers.

17. The system of claim 13, wherein the identification module identifies the existing access-point identifier by:
identifying a set of existing access-point identifiers that exist within a predetermined region, where each existing access-point identifier in the set appears in the predetermined region with a frequency that exceeds a predetermined frequency threshold;
selecting the existing access-point identifier from the set of existing access-point identifiers.

18. The system of claim 17, wherein the identification module filters the set of existing access-point identifiers in order to prevent predetermined text from being selected as part of the existing access-point identifier.

19. The system of claim 13, wherein the verifying module verifies that the existing access-point identifier is not being used within a predetermined proximity of the physical location of the configurable wireless access point by:
- retrieving, from a database of access-point identifiers, a list of access-point identifiers that are in use within the predetermined proximity of the physical location of the configurable wireless access point;
- verifying that the existing access-point identifier is not on the list of access-point identifiers that are in use within the predetermined proximity.

20. A non-transitory computer-readable medium comprising one or more computer-readable instructions that, when executed by at least one processor of a computing device, cause the computing device to:
- receive a request to establish an identifier for a configurable wireless access point;
- identify an existing access-point identifier that is used to identify at least one additional wireless access point;
- determine a physical location of the configurable wireless access point;
- verify that the existing access-point identifier is not being used within a predetermined proximity of the physical location of the configurable wireless access point;
- assign the existing access-point identifier to the configurable wireless access point.

* * * * *